(12) United States Patent
Herman et al.

(10) Patent No.: US 11,519,840 B2
(45) Date of Patent: Dec. 6, 2022

(54) HYDROPHOBIC COATING CHARACTERIZATION

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US); Sunil Reddy Patil, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 990 days.

(21) Appl. No.: 16/253,851

(22) Filed: Jan. 22, 2019

(65) Prior Publication Data
US 2020/0232895 A1    Jul. 23, 2020

(51) Int. Cl.
| | |
|---|---|
| *G01N 13/02* | (2006.01) |
| *B60S 1/08* | (2006.01) |
| *G02B 1/18* | (2015.01) |
| *G06N 3/08* | (2006.01) |
| *G06N 3/04* | (2006.01) |
| *G01N 15/14* | (2006.01) |

(52) U.S. Cl.
CPC ............ *G01N 13/02* (2013.01); *B60S 1/0822* (2013.01); *G02B 1/18* (2015.01); *C03C 2217/76* (2013.01); *G01N 2013/0208* (2013.01); *G01N 2015/1406* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 5,583,285 A | 12/1996 | Hahn et al. | |
| 2002/0083834 A1* | 7/2002 | Durner | B01D 45/12 55/423 |
| 2004/0144911 A1* | 7/2004 | Stam | B60S 1/0844 250/227.25 |
| 2013/0045332 A1* | 2/2013 | Fang | B32B 25/20 118/100 |

(Continued)

FOREIGN PATENT DOCUMENTS

| | | |
|---|---|---|
| CN | 101539502 B | 1/2011 |
| CN | 202770733 U | 3/2013 |

(Continued)

OTHER PUBLICATIONS

Hansen, et al., "Chapter 1 The Image Deblurring Problem", Fundamentals of Algorithms, Deblurring Images: Matrices, Spectra, and Filtering, Society for Industrial and Applied Mathematics, retrieved from Internet URL: https://archive.siam.org/books/fa03/FA03Chapter1.pdf (12 pages).

(Continued)

*Primary Examiner* — Edemio Navas, Jr.
(74) *Attorney, Agent, or Firm* — Frank A. MacKenzie; Bejin Bieneman PLC

(57) ABSTRACT

A system includes a processor and a memory storing instructions executable by the processor to actuate a component upon determining that a hydrophobic coating of a surface is degraded based on a comparison of a characteristic of a liquid droplet with a threshold value.

19 Claims, 6 Drawing Sheets

(56) References Cited

U.S. PATENT DOCUMENTS

| | | | | |
|---|---|---|---|---|
| 2015/0198514 | A1* | 7/2015 | Dan-Jumbo | G01M 5/0016 |
| | | | | 73/64.52 |
| 2016/0078691 | A1* | 3/2016 | Roepke | H04W 88/02 |
| | | | | 701/33.2 |
| 2017/0284921 | A1 | 10/2017 | Aimirfazli | |
| 2018/0178217 | A1* | 6/2018 | Jebrail | B01L 7/525 |
| 2018/0272996 | A1* | 9/2018 | Nielsen | B60S 1/52 |
| 2020/0079325 | A1* | 3/2020 | Tilleman | B60S 1/0837 |
| 2020/0139936 | A1* | 5/2020 | Yamauchi | B60S 1/485 |

FOREIGN PATENT DOCUMENTS

| | | |
|---|---|---|
| JP | 6287155 B2 | 9/2013 |
| WO | 2017119715 A1 | 7/2017 |

OTHER PUBLICATIONS

Tao, et al., "Sharpening Out of Focus Images Using High-Frequency Transfer", Computer Graphics Forum 2013, The Eurographics Association and Blackwell Publishing Ltd., vol. 32, No. 2 (10 pages).

Roser et. al., "Realistic Modeling of Water Droplets for Monocular Adherent Raindrop Recognition Using Bezier Curves", Department of Measurement and Control, Karlsruhe Institute of Technology (KIT), Karlsruhe, Germany (10 pages).

Schuler, et. al., "Learning to Deblur", Max Planck Institute for Intelligent Systems, IEEE Transactions on Pattern Analysis and Machine Intelligence, vol. 38, Issue 7, Jul. 2016 (28 pages) retrieved from Internet URL: https://arxiv.org/pdf/1406.7444.pdf.

Yzhikov, "Restoration of Defocused and Blurred Images" retrieved from Internet URL: http://yuzhikov.com/articles/blurredimagesrestoration1.htm (29 pages).

You, et. al., "Waterdrop Stereo", retrieved from Internet URL: https://www.researchgate.net/publication/301878392 (13 pages).

Yuan, et. al., "Chapter 1 Contact Angle and Wetting Properties", Surface Science Techniques 2013 (pp. 3-34) retrieved from Internet URL: https://link.springer.com/chapter/10.1007%2F978-3-642-34243-1_1 (33 pages).

Lu, "Out-of-Focus Blur: Image De-Blurring", ECE802-608 Final Project Report, Department of Biosystems and Agricultural Engineering, Michigan State University, May 6, 2016 (11 pages).

* cited by examiner

HYDROPHOBIC COATING CHARACTERIZATION

BACKGROUND

A vehicle includes one or more transparent surfaces, such as a windshield, through which light may travel and be detected, e.g., by an operator or optical sensor. The surfaces may have a hydrophobic coating which affects an ability of the surface to shed water and other contaminants. The properties of the coating may change over time affecting the performance of the coating and interfere with vehicle operation, e.g. water removal, perception, etc.

DETAILED DESCRIPTION

Introduction

Figure 1:
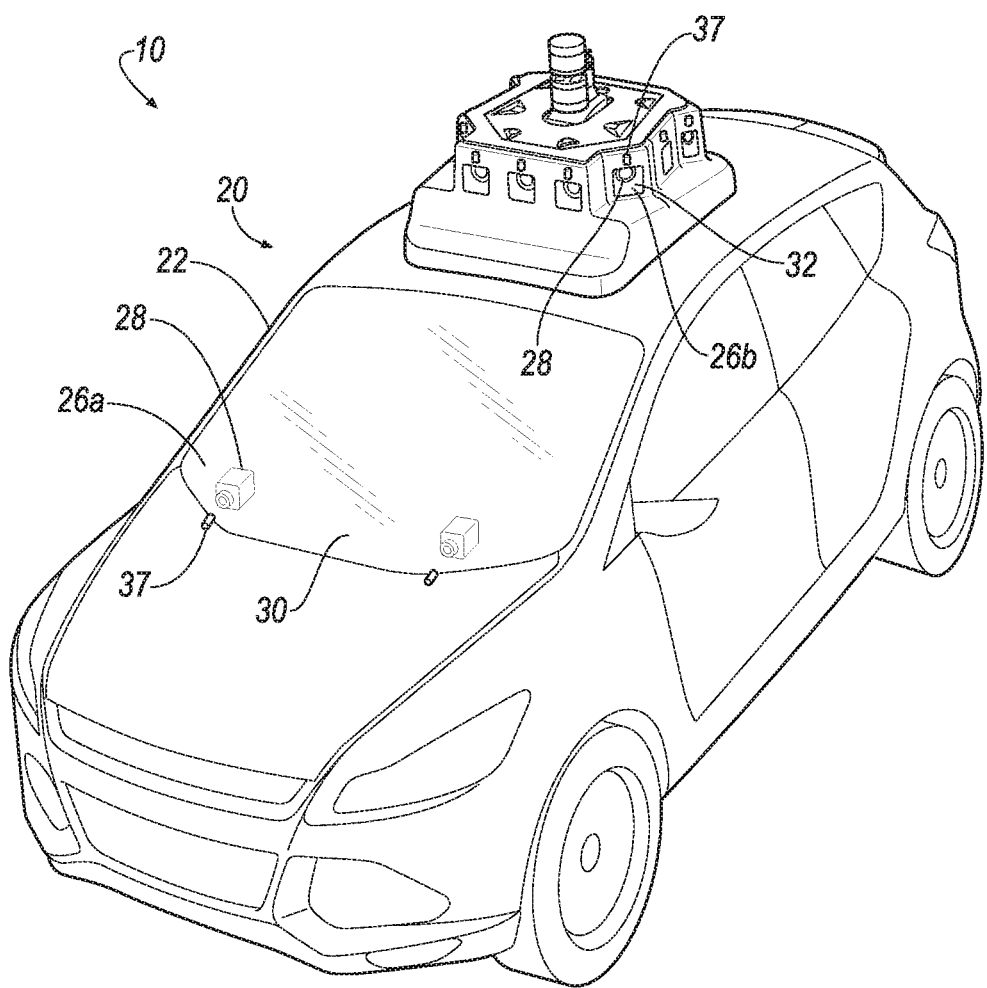
FIG. 1 is a perspective view of a vehicle having a system for detecting hydrophobic coating of a surface.

A system includes a processor and a memory storing instructions executable by the processor to actuate a component upon determining that a hydrophobic coating of a surface is degraded based on a comparison of a characteristic of a liquid droplet with a threshold value.

The instructions may further include instructions to compare an amount of distortion of an image reflected by the liquid droplet with a threshold distortion value.

The instructions may further include instructions to determine an object on the surface is the liquid droplet before the comparison of the characteristic of the liquid droplet with the threshold value.

The instructions may further include instructions to actuate a cleaning system to clean the surface before the comparison of the characteristic of the liquid droplet with the threshold value.

The instructions may further include instructions to actuate a cleaning system to provide a specified amount of liquid to the surface before the comparison of the characteristic of the liquid droplet with the threshold value.

The instructions may further include instructions to at least one of transmit a fault code and store the fault code upon determining that the hydrophobic coating of the surface is degraded.

The instructions may further include instructions to increase an interval of actuation for a cleaning system upon determining that the hydrophobic coating of the surface is degraded.

The instructions may further include instructions to compare a contact angle of the liquid droplet with a threshold contact angle.

The instructions may further include instructions to compare a distribution of the liquid droplet and one or more other liquid droplets with a threshold distribution.

The instructions may further include instructions to compare a size of the liquid droplet with a threshold size.

The instructions may further include instructions to identify the threshold size based on a focal length of an optical sensor.

The system may include an optical sensor defining a field of view and in communication with the processor, wherein the surface is in the field of view.

The system may include a lens, the surface on the lens.

The system may include a windshield, the surface on the windshield.

A method includes determining that a hydrophobic coating of a surface is degraded based on a comparison of a measurement a liquid droplet with a threshold value, and then, actuating a component.

The comparison of the measurement of the liquid droplet with the threshold value may include comparing a contact angle of the liquid droplet with a threshold contact angle.

The comparison of the measurement of the liquid droplet with the threshold value may include comparing an amount of distortion of an image reflected by the liquid droplet with a threshold distortion.

The method may include determining an object on the surface is the liquid droplet before determining that the hydrophobic coating of the surface is degraded.

A system includes means for detecting a liquid droplet on a surface. The system includes means for actuating a component upon determining that a hydrophobic coating of the surface is degraded based on a comparison of a measurement of the liquid droplet with a threshold value.

The system may include means for comparing a contact angle of the liquid droplet with a threshold contact angle.

With reference to the Figures, wherein like numerals indicate like parts throughout the several views, a system 20 for a vehicle 22 can detect a liquid droplet 24 on a surface 26a, 26b, e.g., with data from an optical sensor 28 directed at a surface 26a of a windshield 30, a surface 26b of a lens 32, etc. The system 20 can further actuate a component of the vehicle 22 upon determining that a hydrophobic coating of the surface 26a, 26b is degraded based on a comparison of a characteristic of the liquid droplet 24 with a threshold value. To actuate a component of the vehicle 22, a computer 34 having a processor and a memory can store instructions executable by the processor to actuate a component of the vehicle 22 upon determining that the hydrophobic coating of the surface 26a, 26b is degraded based on a comparison of a characteristic of a liquid droplet 24 with a threshold value.

As used herein, vehicle components are systems, assemblies, sub-assemblies, and other structures actuatable by the computer 34 to perform a function. For example, a cleaning system 36 of the vehicle 22 may be actuated to clean the surface 26a, 26b. As another example, a transceiver of the vehicle 22 may be actuated to transmit a message. As yet another example, the memory of the vehicle 22 may be actuated to store data. As one other example, a braking system 33, a propulsion system 35, and/or a steering system 31 of the vehicle 22 may be actuated to navigate the vehicle, such as to specified location for servicing to repair or replace the hydrophobic coating.

Determining whether the hydrophobic coating is degraded provides efficient use vehicle resources, e.g., adjusting intervals of actuating the cleaning system 36 based on degradation of the hydrophobic coating, such as cleaning the surface 26a, 26b more frequently and with a greater amount of compressed air or fluid when the hydrophobic coating is degraded (as compared to when the hydrophobic coating is undegraded). Determining whether the hydrophobic coating is degraded allows the vehicle 22 to take remedial action to have the degraded hydrophobic coating repaired and/or replaced, e.g., by storing and/or transmitting a fault code, by displaying a fault code to the driver, by adjusting perception algorithms, by driving autonomously to a service depot for repair or replacement of the coating and/or optical surface.

System

The vehicle 22 may be any type of passenger or commercial automobile such as a car, a truck, a sport utility vehicle, a crossover vehicle, a van, a minivan, a taxi, a bus, etc.

The windshield 30 protects an interior of the vehicle 22, e.g., from the elements and/or other debris. The windshield 30 is transparent such that light may pass through the windshield 30 to the optical sensor 28, e.g., such that occupants of the vehicle 22 may see through. The windshield 30 may be fully or partially transparent, i.e., may allow light to pass through substantially entirely or partially. The windshield 30 may be supported by the vehicle 22 at a forward end of a passenger cabin, a rearward end of the passenger cabin, etc. The surface 26a may be planar or curved. The surface 26a may face away from the passenger cabin, e.g., relative to a remainder of the windshield 30. In other words, the surface 26a may be outside the passenger cabin.

The optical sensor 28 detects light. The optical sensor 28 may be a scanning laser range finder, a light detection and ranging (LIDAR) device, a time of flight camera, an image processing sensor such as a camera, or any other sensor that detects light. One more or more optical sensors 28 may be supported by the vehicle 22. For example, one of the optical sensors 28 may detect light through the windshield 30 and another of the optical sensors 28 may detect light through the lens 32. In another example, the optical sensor 28 could measure both the reflectivity of objects and their distances, e.g. a time of flight camera. The optical sensor 28 may detect one or more wavelengths, such as red, blue, green, visible light, near infrared, ultraviolet, etc. The optical sensor 28 is in communication with the processor such that image data from the optical sensor 28 may be received by the processor. For example, the optical sensor 28 may be in communication with the computer 34 via a communication network 38.

The optical sensor 28 defines a field of view 40. The field of view 40 is a volume relative to the optical sensor 28 from which light is detectable by the optical sensor 28. In other words, light generated by, and/or reflected from, an object within the field of view 40, and towards the optical sensor 28, is detectable by the optical sensor 28, provided the light is not blocked before reaching the optical sensor 28. The surface 26a, 26b is in the field of view 40, e.g., light from outside the vehicle 22 passes through the surface 26a, 26b before being detected by the optical sensor 28.

Figure 5A:
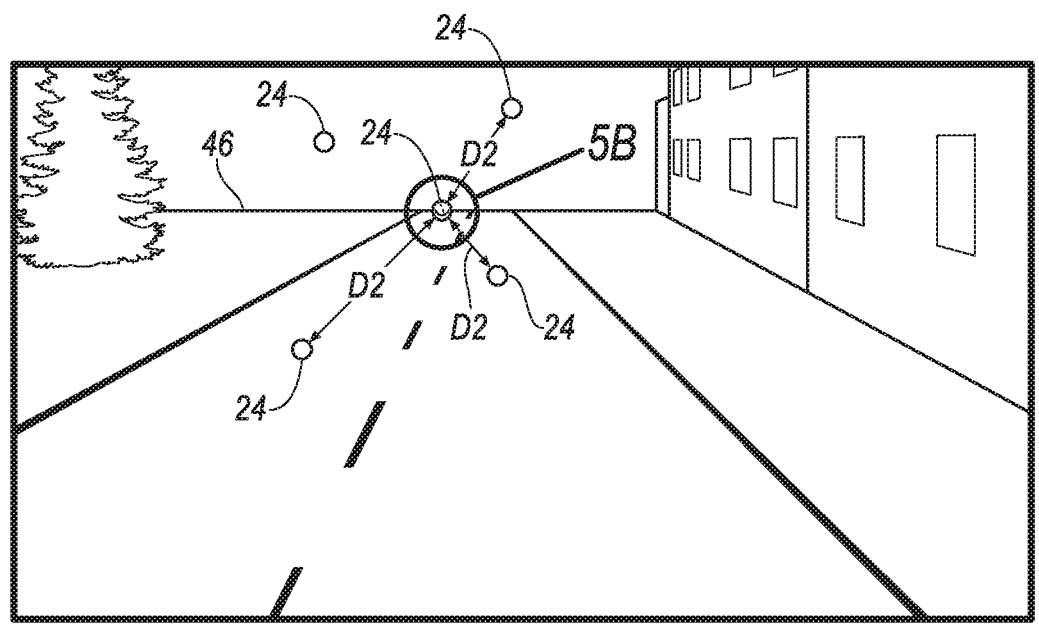
FIG. 5A is an illustration of an example image captured by the optical sensor.
Figure 5B:
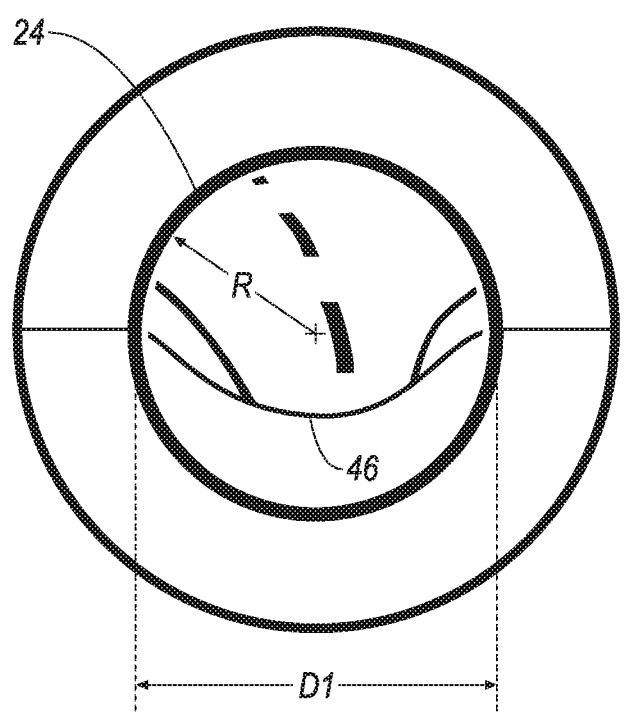
FIG. 5B is an enlargement of a portion of FIG. 5.
Figure 6:
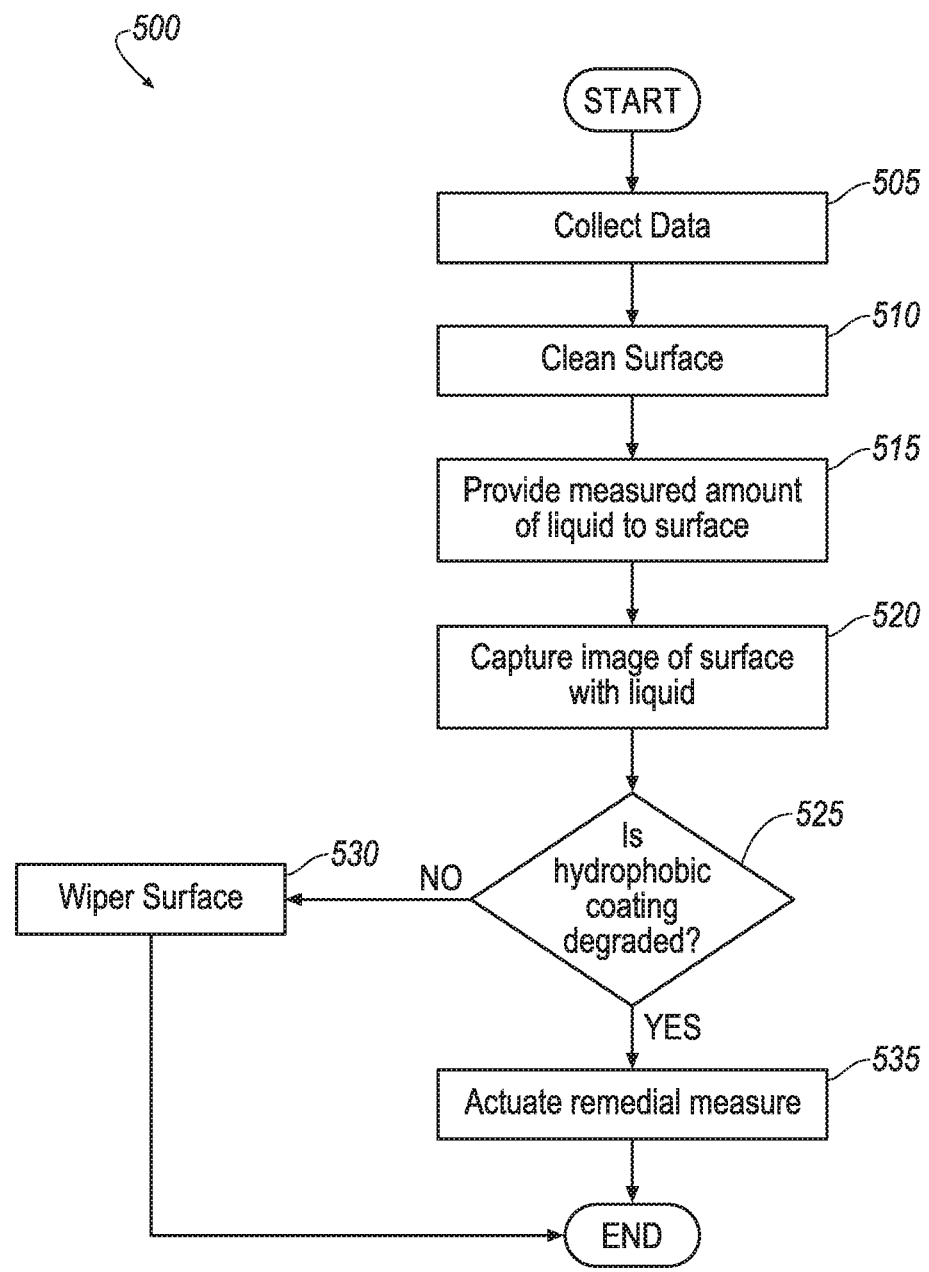
FIG. 6 is a flow chart illustrating a process for controlling the vehicle having the system for detecting hydrophobic coating of a surface.

The optical sensor 28 can provide image data based on light detected from within the field of view 40. The image data represents a detected image with a two-dimensional array of pixels, e.g., a grid having rows and columns of pixels. Each pixel may indicate a color, a brightness, a hue, etc., of light detected from a specific portion of the field of view 40. An illustration of an example image that may be indicated by image data from the optical sensor 28 is shown in FIGS. 5A and 5B. The image data may indicate a focal length of the optical sensor 28 at the time the image data was generated. Focal length is a distance (that in some examples can be varied so that an optical sensor 28 has different focal length at different times) at which light detected by the optical sensor 28 is in focus, i.e., such that objects are substantially accurately represented in the image data without blurring or other distortion. This may be achieved through a lens with an adjustable focal length which is actuated by the computer 34. In another example, the optical sensor 28 may be a plenoptic camera, also known as a light field camera, capable of measuring both the intensity and direction of light rays traveling through space. Such a plenoptic camera is capable of refocusing to any desired depth of field after image capture. In another example, the optical sensor 28 may have a fixed depth of field located at the far field such that the water droplet's image is out of focus. In such cases, computational methods may be used to correct for the out of focus aberration of the water droplets region of the image. The optical sensor 28 may have a field of view that is shared with other optical sensors 28, e.g. stereo cameras, or may have a field of view that is different from the other optical sensors 28.

The lens 32 protects the optical sensor 28. The lens 32 may focus light on the optical sensor 28. The lens 32 may be supported in a window of an automounts driving sensor assembly, e.g., protecting a second lens that focuses light on the optical sensor 28. The lens 32 may be partially or fully transparent. The lens 32 may be plastic, glass, etc. The surface 26b of the lens 32 may be planar or curved. The surface 26b may be away from the optical sensor 28, e.g., relative to a remainder of the lens 32. The lens 32 may be rotationally symmetric or non-rotationally symmetric (e.g., a free form lens).

The vehicle 22 may include other sensors 42. The sensors 42 may detect internal states of the vehicle 22, for example, wheel speed, wheel orientation, and engine and transmission variables. The sensors 42 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 42 may detect the external world, for example, radar sensors, scanning laser range finders, light detection and ranging (LIDAR) devices, and image processing sensors such as cameras. The sensors 42 may include communications devices, for example, vehicle-to-infrastructure (V2I) or vehicle-to-vehicle (V2V) devices.

The hydrophobic coating repulses liquid, such as water, from the surface 26a, 26b. In other words, the hydrophobic coating provides an increased repulsion of liquid as compared to a surface 26a, 26b without the hydrophobic coating. In other words, a variation of surface energy between a surface 26a, 26b with and without hydrophobic coating affects an amount of contact area between the liquid droplet 24 and the surface 26a, 26b as well as an overall three-dimensional shape of the liquid droplet 24. The hydrophobic coating aids in maintaining cleanliness of the surface 26a, 26b. For example, dirt, residue, and other contaminates may be removed more easily, e.g., with less time and/or amount of cleaning fluid, from the surface 26a, 26b having the hydrophobic coating. The hydrophobic coating is a thin layer, e.g., 200-300 nanometers, of hydrophobic material that extends along the surface 26a, 26b. Example hydrophobic materials include manganese oxide polystyrene ($MnO_2$/PS) nano-composite, zinc oxide polystyrene (ZnO/PS) nano-composite, precipitated calcium carbonate, carbon nano-tube structures, silica nano-coating, fluorinated silanes, and fluoropolymer coatings.

Use of the vehicle 22 may degrade the hydrophobic coating. For example, friction from wipers of the cleaning system 36 of the vehicle 22, perpendicular cracking and interfacial fracture (delamination) due to intrinsic and extrinsic stresses, thermal degradation, ultraviolet (UV) light degradation, impacts with objects, etc., may decrease a thickness, change the surface properties, and/or otherwise remove the hydrophobic coating and reduce hydrophobicity of the surface 26a, 26b. Hydrophobicity as is known is a unitless measure and is quantified with various scales that provide relative indications of hydrophobicity, e.g., interface scale, octanol scale, and octanol-interface scale. The hydrophobicity may be indicated by a measured and/or calculated contact angle 44 (illustrated in FIG. 2B) of a liquid droplet 24 with the surface 26a, 26b. A degraded hydrophobic coating may, as compared to hydrophobic coating before becoming degraded, increase an amount of air pressure and/or washer fluid required by the cleaning system 36 to clean the surface 26a, 26b, increase a frequency at which the cleaning system 36 is actuated to maintain cleanliness of the surface 26a, 26b, and/or decrease a resolution of image data captured by the optical sensor 28.

Characteristics of the liquid droplet 24 may be indicative of the whether the hydrophobic coating is degraded. As used herein, a characteristic of the liquid droplet 24 is a measurable or calculable quality of the liquid droplet 24. For example, the characteristic may be a contact angle 44, a size, a shape, a transparency, an amount of distortion of an image reflected by the liquid droplet 24, a distribution of the liquid droplet 24 and one or more other liquid droplets 24, a luminosity gradient of the liquid droplet 24, or some other measurable characteristic that may correlate with degradation of the hydrophobic coating.

The contact angle 44 is the angle between the surface 26a, 26b and an outer surface of the liquid droplet 24 at the surface 26a, 26b, as shown in FIG. 5B for the surface 26a. The contact angle 44 may vary at different locations about a perimeter of the liquid droplet 24. For example, when the surface 26a, 26b is inclined or vertical relative to level ground, a downhill side of the liquid droplet 24 will have a greater contact angle 44 than an uphill side. The greater the degradation of the hydrophobic coating the higher the contact angle 44, and vice versa.

Figure 2A:
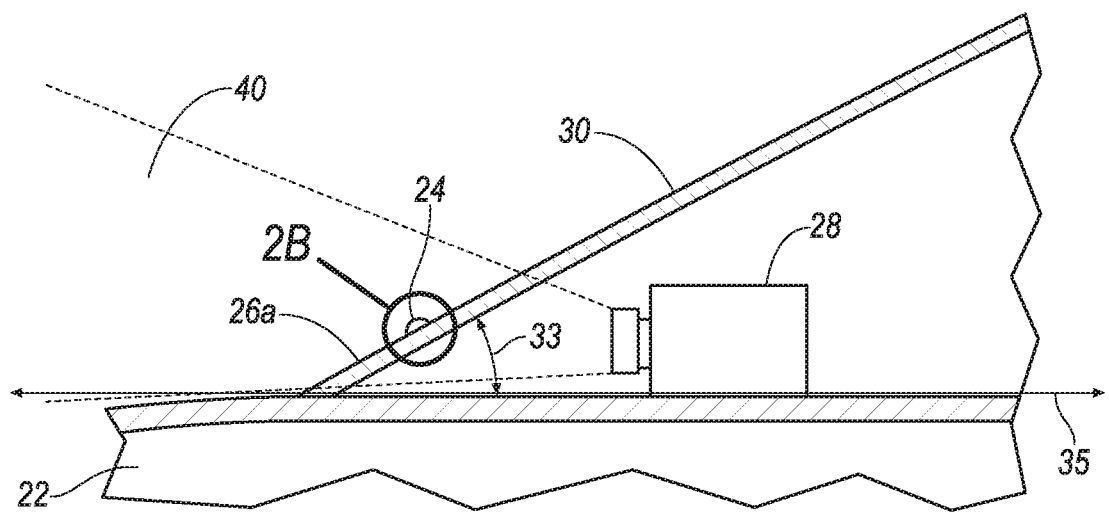
FIG. 2A is a section view of a portion of the vehicle including a windshield and an optical sensor.
Figure 2B:
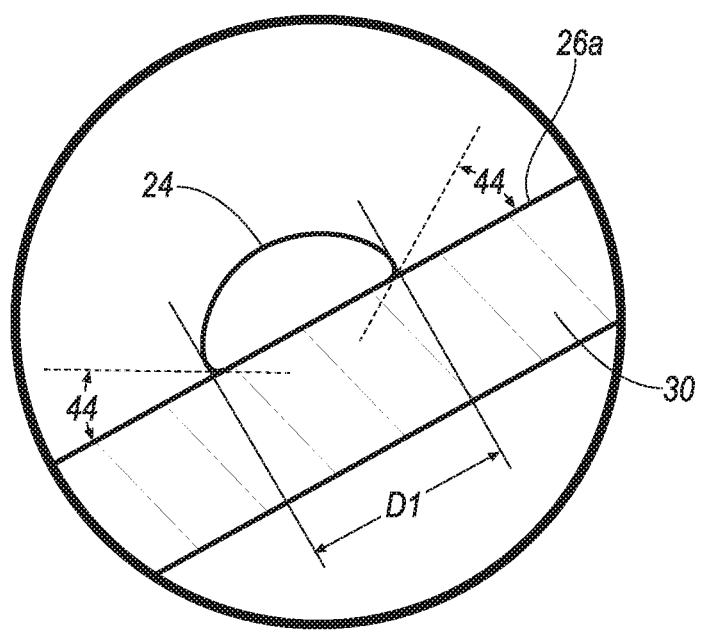
FIG. 2B is an enlargement of a portion of FIG. 2.

As used herein, a size of a liquid droplet 24 is a measurement of the liquid droplet 24 between points on the surface 26a, 26b. For example, size may be a length, a width, a diameter, an area, etc., of a portion of the liquid droplet 24 that contacts the surface 26a, 26b. Example size measurements are shown in FIGS. 2B and 5B as diameter D1. Generally, a liquid droplet 24 having a specific volume of fluid will have a smaller size on a surface 26a, 26b with greater hydrophobicity. In other words, a liquid droplet 24 will have a smaller size as measured along a surface 26a, 26b with an undegraded hydrophobic coating, and such liquid droplet 24 (having the same volume of fluid) will have a larger size after the hydrophobic coating is degraded.

As used herein, a shape of a liquid droplet 24 is a two-dimensional shape of a contact area of the liquid droplet 24 along a surface 26a, 26b. For example, the shape may be a roundness, i.e., a measure of how closely the shape approaches that of a circle. Roundness is measured as a magnitude of variation of radii R (shown in FIG. 5B) at different locations along a perimeter of the contact area of the liquid droplet 24 along the surface 26a, 26b. Greater variation among radii R indicates a lower roundness, and vice versa. The radii R used to determine the roundness of the liquid droplet 24 is measured from a center of the contact area of the liquid droplet 24 along a surface 26a, 26b. The center is determined by calculating a mean center of the perimeter of the contact area. Locations of pixels in the image data, e.g., x,y coordinates or the like indicating a column and a row of each pixel in the image data, at the perimeter are used to calculate the mean center. For example, the x values of all such pixels may be summed and then divided by the number of such pixels to calculate the x value of the mean center. Similarly, the y values of all such pixels may be summed and then divided by the number of such pixels to calculate the y value of the mean center. Generally, a liquid droplet 24 having a specific volume of fluid will be rounder, i.e., have radii R with lower magnitude of variations, on a surface 26a, 26b with greater hydrophobicity. In other words, a liquid droplet 24 will have a greater roundness, i.e., variations of lower magnitude, as measured along a surface 26a, 26b with an undegraded hydrophobic coating, and such liquid droplet 24 (having the same volume of fluid) will have a lower roundness, i.e., variation of greater magnitude, after the hydrophobic coating is degraded.

As used herein, a transparency of a liquid droplet 24 is a measurement, such as brightness (e.g., in lux), of an amount of light that that passes though the liquid droplet 24 without being absorbed by the liquid droplet 24. Generally, a liquid droplet 24 having a specific volume of fluid will have a lower transparency on a surface 26a, 26b with greater hydrophobicity. In other words, a liquid droplet 24 on a surface 26a, 26b with an undegraded hydrophobic coating will absorb more light, and such liquid droplet 24 (having the same volume of fluid) will absorb less light after the hydrophobic coating is degraded.

As used herein, a luminosity gradient of the liquid droplet 24 is a variation of brightness along a radius R of a contact area between the liquid droplet 24 and the surface 26a, 26b. For example, brightness will be lowest at an outer perimeter of the contact area and increase along the radius R toward a center of the contact area. The luminosity gradient may be measured as a rate at which the brightness increases along the radius toward the center (e.g., an increase of 10 lux per millimeter). Generally, a liquid droplet 24 having a specific volume of fluid will have a luminosity gradient with a higher amount of increased brightest per unit of length on a surface 26a, 26b with greater hydrophobicity. In other words, a liquid droplet 24 on a surface 26a, 26b with an undegraded hydrophobic coating will transition from dark to light along a shorter distance than such liquid droplet 24 (having the same volume of fluid) after the hydrophobic coating is degraded.

As used herein, an amount of distortion, e.g., barrel distortion, of an image reflected by the liquid droplet 24 is a measurement of an amount of deviation of the image reflected by the liquid droplet 24 as compared to a base image without such distortion, e.g., image data from light not reflected by the liquid droplet 24 and captured by the optical sensor 28. Distortion is caused by the liquid droplet 24 functioning as a fish-eye type lens, e.g., light striking the liquid droplet 24 and reflected to the optical sensor 28 is collected from a wider angle as compared to light collected by the optical sensor 28 without being reflected by the liquid droplet 24. Distortion may be measured as a unitless coefficient, e.g., such as a distortion coefficient in a model used to remove distortion from the distorted image. One example of such model is Brown's distortion model, also referred to as the Brown-Conrady model. Other conventional models conventional, such as mesh deformation models, may be used. Distortion may be measured as a curvature, i.e., a radius of such curvature, for a curved object in the image data that is typically linear. For example, a horizon 46 in the image reflected by the liquid droplet 24 may be curved and may not be curved without reflection by the liquid droplet 24 (compare, e.g., horizons 46 in FIGS. 5A and 5B). As another example, one or more objects in the image reflected by the liquid droplet 24 may be skewed to have an appearance different than such objects actual shape (e.g., wider, taller, etc.). Generally, a liquid droplet 24 having a specific volume of fluid will provided a greater amount of distortion on a surface 26a, 26b with greater hydrophobicity. In other words, a reflected image from a liquid droplet 24 on an undegraded hydrophobic coating will have more distortion than a reflected image from such liquid droplet 24 (having the same volume of fluid) after the hydrophobic coating is degraded.

As use herein, a distribution of a liquid droplet 24 and one or more other liquid droplets 24 is a measurement of spacing between the liquid droplet 24 and one or more other liquid droplets 24 along the surface 26a, 26b. The spacing may be measured as a linear distance between closest points on the liquid droplets 24 to each other, between centers of the liquid droplets 24, etc. Spacing between liquid droplets 24 is illustrated as distance D2 in FIG. 5. Generally, a spacing between liquid droplets 24 will be greater on a surface 26a, 26b with greater hydrophobicity. In other words, a spacing between liquid droplets 24 will be greater on a surface 26a, 26b with an undegraded hydrophobic coating, and such spacing will be less after the hydrophobic coating is degraded.

External factors may affect the characteristics of a liquid droplet 24. For example, an angle 33 (shown in FIG. 2) of the surface 26a, 26b, e.g., relative to an absolute horizontal axis 35, may affect the characteristics of a liquid droplet 24. In addition, the vehicle orientation relative to the force of gravity will also affect the characteristics of the liquid droplet 24. The greater the angle 33, the greater the contact angle 44 at the downhill side and lower the contact angle 44 on the uphill side. In other words, the greater the angle 33, the more the droplet may droop away from a general spherical shape to an elongated or tear drop shape. As another example, air movement across the surface 26a, 26b, e.g., from movement of the vehicle 22 or wind, may affect the characteristics of the liquid droplet 24. The greater a speed of such air, the greater the contact angle 44 at a leeward side and the lower the contact angle 44 will be on a windward side, e.g., urging the liquid droplet 24 into a tear drop shape that is elongated parallel to a direction of the air movement relative to the surface 26a, 26b. Other external factors that may affect characteristics of the liquid droplet 24 include an ambient temperature, pressure, humidity, etc., of air external to the vehicle 22.

The cleaning system 36 removes objects and contaminants from the surface 26a, 26b of the windshield 30, the surface 26a, 26b of the lens 32, etc., e.g., in response to an instruction from the computer 34. The cleaning system 36 may include one or more nozzles 37 directed at the surface 26a, 26b. The nozzle(s) 37 may be provided with a flow of fluid, e.g., liquid washer fluid from a tank, compressed air from a tank, air from a blower connected to a motor, etc., e.g., when the cleaning system 36 is actuated to an on state. The fluid may remove contaminates from the surface 26a, 26b. Fluid from the nozzle 37 may be provided at a specified pressure, rate, duration, etc. The cleaning system 36 may include wipers operable to wipe the surface 26a, 26b. Other techniques may be included such as ultrasonic vibration. The cleaning system 36 may be in communication with the computer 34.

The steering system 31 controls a steering angle of wheels of the vehicle 22, e.g., in response to an instruction from the computer 26, in response to an operator input, such as to a steering wheel, or combination of the two such in the case of driver assistive technologies. The steering system 31 may be a rack-and-pinion system with electric power-assisted steering, a steer-by-wire system, or any other suitable system for controlling the steering angle of the wheels. The steering system 31 may be in communication with the computer 26.

The braking system 33 resists motion of the vehicle 22 to thereby slow and/or stop the vehicle 22, e.g., in response to an instruction from the computer 26 and/or in response to an operator input, such as to a brake pedal. The braking system 33 may include friction brakes such as disc brakes, drum brakes, band brakes, and so on; regenerative brakes; any other suitable type of brakes; or a combination. The braking system 33 may be in communication with the computer 26.

The propulsion system 35 translates energy into motion of the vehicle 22, e.g., in response to an instruction from the computer 26 and/or in response to an operator input, such as to an accelerator pedal. For example, the propulsion system 35 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the vehicle 22. The propulsion system 35 may be in communication with the computer 26.

The vehicle 22 may include a navigation system 37 that can determine a location of the vehicle 22. The navigation system 37 is implemented via circuits, chips, or other electronic components. The navigation system 37 may be implemented via satellite-based system such as the Global Positioning System (GPS). The navigation system 37 may triangulate the location of the vehicle 22 based on signals received from various satellites in the Earth's orbit. The navigation system 37 is programmed to output signals representing the location of the vehicle 22 to, e.g., to the computer 26 via a communication network 46. In some instances, the navigation system 37 is programmed to determine a route from the present location to a future location. The navigation system 37 may access a virtual map stored in memory of the navigation system 37 and/or computer 26, and develop the route according to the virtual map data. The virtual map data may include lane information, including a number of lanes of a road, widths and edges of such lanes, etc. The navigation system 37 may store specified locations, e.g., as GPS coordinates. The locations may be associated with information about the location, e.g., that a specified location is suitable for servicing the vehicle 22 to repair or replace the hydrophobic coating.

The communication network 38 includes hardware, such as a communication bus, for facilitating communication among vehicle components, such as the computer 34, the steering system 31, the braking system 33, the propulsion system 35, navigation system 37 the cleaning system 36, the optical sensor 28, and other sensors 42. The communication network 38 may facilitate wired or wireless communication among the vehicle components in accordance with a number of communication protocols such as controller area network (CAN), Ethernet, WiFi, Local Interconnect Network (LIN), and/or other wired or wireless mechanisms.

Figure 3:
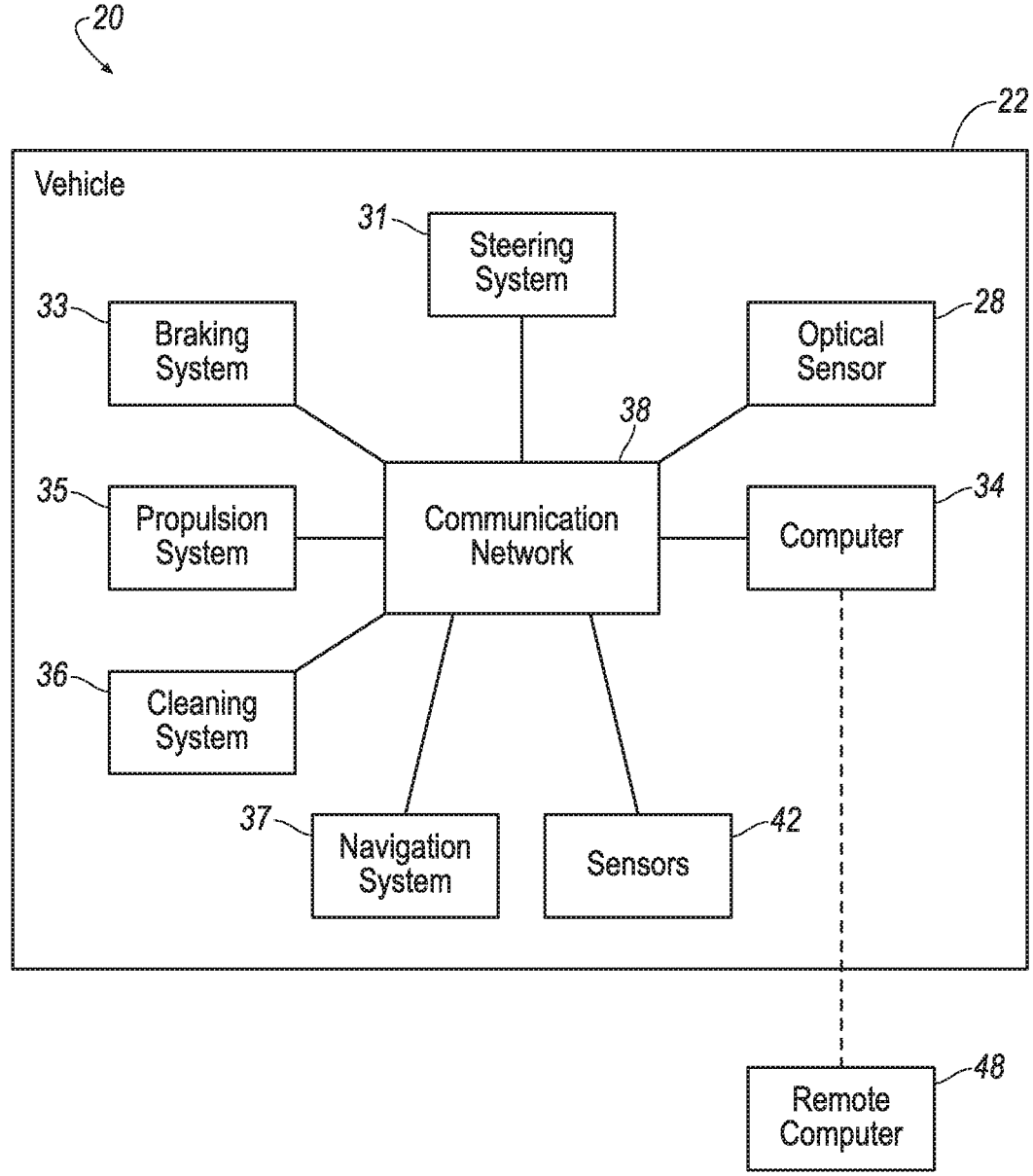
FIG. 3 is a block diagram of components of the system and the vehicle.

The computer 34, implemented via circuits, chips, or other electronic components, is included in the system 20 for carrying out various operations, including as described herein. The computer 34 is a computing device that generally includes a processor and a memory, the memory including one or more forms of computer-readable media and storing instructions executable by the processor for performing various operations, including as disclosed herein. The memory of the computer 34 further generally stores remote data received via various communications mechanisms; e.g., the computer 34 is generally configured for communications on the communication network 38 or the like, may include a transceiver, and/or may be configured for using other wired or wireless protocols, e.g., Universal Serial Bus (USB), Bluetooth®, IEEE 802.11 (colloquially referred to as WiFi®), satellite telecommunication protocols, and cellular protocols such as 3G, LTE, etc. The computer 34 may also have a connection to an onboard diagnostics connector (OBD-II). Via the communication network 38 and/or other wired or wireless mechanisms, the computer 34 may transmit messages to various devices in the vehicle 22 and/or receive messages from the various devices, e.g., the optical sensor 28, the cleaning system 36, the sensors 42, the remote computer 48, etc. Although one computer 34 is shown in FIG. 3 for ease of illustration, it is to be understood that the computer 34 could include, and various operations described herein could be carried out by, one or more computing devices including computing devices remote from and in communication with the vehicle 22.

The computer 34 may be programmed to, i.e., the memory may non-transitively store instructions executable by the processor to, actuate the cleaning system 36. The computer 34 may actuate the cleaning system 36 by transmitting an instruction to the cleaning system 36, e.g., via the communication network 38. The instruction may command, for example, actuation of a motor of the cleaning system 36 to move wipers of the cleaning system 36 to wipe the surface 26a, 26b, actuation of a blower motor of the cleaning system 36 to provide air to the surface 26a, 26b via the nozzles 37, and/or actuation of a pump of the cleaning system 36 to provide fluid to the surface 26a, 26b via the nozzles 37.

The computer 34 may be programmed to actuate the cleaning system 36 to provide a specified amount of liquid to the surface 26a, 26b. Providing a specified amount of fluid to the surface 26a, 26b enables consistent spray of liquid onto the surface 26a, 26b. For example, when other variables remain constant (e.g., air and vehicle 22 movement, an amount of hydrophobic coating degradation, etc.), the size, shape, distribution, etc., of liquid droplets 24 on the surface 26a, 26b from actuation of the cleaning system 36 should be the same for each actuation of the cleaning system 36 when providing the specified amount of liquid. The computer 34 may actuate the cleaning system 36 to provide the specified amount of fluid by transmitting an instruction to the cleaning system 36, e.g., via the communication network 38, specifying an amount of fluid for the cleaning system 36 to provide. For example, such instruction may indicate an amount of time, e.g., 0.5 seconds, for a pump of the cleaning system 36 to actuate and pump liquid, e.g., when a flow rate of such pump is constant.

The computer 34 may actuate the cleaning system 36 at intervals. As used herein, an interval is a duration of time, e.g., used to actuate the cleaning system 36. As one example, an interval may specify a frequency at which the cleaning system 36 is actuated, e.g., where an increased interval indicates a higher frequency, e.g., with less time between actuations of the cleaning system 36. As another example, an interval may be a duration of time or amount of pressure that fluid is provided by the cleaning system 36 when actuated to clean the surface 26a, 26b, e.g., where an increased interval indicates that the cleaning system 36 will provide fluid for a longer amount of time. The computer 34 may increase an interval of actuation for the cleaning system 36 upon determining that the hydrophobic coating of the surface 26a, 26b is degraded. For example, the computer 34 may actuate the cleaning system 36 to clean the surface 26a, 26b more frequently and/or to provide fluid to the surface 26a, 26b for a longer duration and/or at a higher pressure when actuating to clean the surface 26a, 26b.

The computer 34 may be programmed to store a fault code, e.g., in the memory of the computer 34. As used herein, a fault code is an indication that one or more components, systems, etc., of the vehicle 22 are faulted, i.e., in a condition that is not optimal for operation of the vehicle 22. The fault code may indicate that hydrophobic coating is degraded. Additionally or alternately, the computer 34 may be programmed to transmit a fault code, e.g., to a computer 48 remote from the vehicle 22 via cellular protocols.

The computer 34 may be programmed to operate the vehicle 22 in an autonomous mode, a semi-autonomous mode, or a non-autonomous mode. For purposes of this disclosure, the autonomous mode is defined as one in which each of propulsion system 35, the braking system 33, and the steering system 31 are controlled by the computer 34; in a semi-autonomous mode the computer 34 controls one or two of the propulsion system 35, the braking system 33, and the steering system 31; in a non-autonomous mode, a human operator controls the propulsion system 35, the braking system 33, and the steering system 31.

The computer 34 may be programmed to actuate the vehicle 22 to navigate the vehicle 22 to a specific location in the autonomous mode. For example, the computer 34 may send commands via the communication network 38 to the propulsion system 35, the braking system 33, and the steering system 31 to navigate the vehicle 34 to a specified location that is suitable for servicing the vehicle 22 to repair or replace the hydrophobic coating and based on data from the optical sensors 28, the sensors 42, and the navigation system 37.

The computer 34 is programed to determine that an object in the field of view 40 of the optical sensor 28 is a liquid droplet 24 on the surface 26a of the windshield 30 and/or the surface 26b of the lens 32. For example, the computer 34 may analyze image data from the optical sensor 28 to identify the liquid droplet 24 with image recognition techniques. In one example, the computer 34 may identify groupings of pixels in image data having a certain shape, color, brightness, luminosity gradient, size, etc. The shape may be compared to prestored a threshold shape, e.g., a roundness tolerance having a radius of +/−1 millimeter from a center the pixel grouping. The brightness may be compared to one or more brightness thresholds, e.g., brighter than 1200 lux and dimmer than 120 lux. The size may be compared to one or more threshold sizes, e.g., smaller than 12 millimeters and greater than 2 millimeters. Thresholds may be predetermined and stored on the memory of the computer 34. The thresholds may be predetermined based on empirical testing, e.g., analysis of image data of one or more known liquid droplets 24 on a surface 26a, 26b. The computer 34 may select among one or more stored thresholds, e.g., based on a time of day, amount of ambient light, analysis of a remainder of pixel in the image data, etc. For example, during the day liquid droplets 24 on the surface 26a, 26b may be less bright than a remainder of image and during the night liquid droplet 24 on the surface 26a, 26b may be brighter, e.g., from reflecting headlights of another vehicle 22, a streetlight, etc. The computer 34 may use other techniques and processes to identify the liquid droplet 24. For example, the computer 34 may use a conventional and appropriately trained convolution neural network to perform semantic segmentation to identify individual droplets and the corresponding pixels. An example convolution neural network is disclosed in U.S. patent application Ser. No. 16/136,629, incorporated herein by reference.

The computer 34 is programed to determine whether the hydrophobic coating of the surface 26a, 26b is degraded by comparing a characteristic of a liquid droplet 24 with a threshold value. Threshold values are limits and/or ranges against which the characteristic may be compared. Threshold values may be predetermined and stored in the memory of the computer 34. For example, real world testing and/or computer modeling may indicate various characteristics of a liquid droplet 24 on a surface 26a, 26b at various stages of degradation of the hydrophobic coating. The liquid droplets 24 used for such testing may be provided by the cleaning system 36, e.g., when actuated to provide the specified amount. Threshold value(s) may be selected based on such testing to indicate a certain level of degradation. Example thresholds include a threshold distortion value, a threshold contact angle, a threshold size, a threshold transparency, a threshold distribution, a threshold luminosity gradient, etc. The testing/modeling to determine the various thresholds maybe conducted with a measure amount of specific liquid that is provided to the surface 26a, 26b with a certain method, e.g., with the cleaning system 36 as described above.

The computer 34 may be programmed to compare a size of the liquid droplet 24 with a threshold size. The computer 34 may determine a size of the liquid droplet 24 based on a size of a group of pixels identified as the liquid droplet 24 in the image data. The size may be a diameter D1 of group of pixels, e.g., when the liquid droplet 24 is round. The size may be a length and/or width of the group pixels, e.g., when the liquid droplet 24 is elongated by air outside the vehicle 22 applying force to the liquid droplet 24, movement of the liquid droplet 24 relative to the vehicle 22 when the vehicle 22 is accelerating, etc. The threshold may be a maximum size, e.g., a maximum diameter (such as 2.5 millimeters), width, etc., of the liquid droplet 24 at which the hydrophobic coating is considered undegraded. In other words, the computer 34 may determine that the hydrophobic coating is undegraded when the computer 34 identifies the size of the liquid droplet 24 is at or below the threshold size and the computer 34 may determine that the hydrophobic coating is degraded when the computer 34 identifies the size of the liquid droplet 24 is above the threshold size.

A threshold size may be selected based on real world testing and/or computer modeling. The threshold size may be selected such that liquid droplets 24 above the threshold size are shed from a surface 26a, 26b having an undegraded hydrophobic coating and are not shed from a surface 26a, 26b having a degraded hydrophobic coating. For example, gravity may provide sufficient force to urge a liquid droplet 24 above the threshold size to move along the surface 26a, 26b having the undegraded hydrophobic coating, e.g., until such liquid droplet 24 is out of the field of view 40 of the optical sensor 28, and may not provide sufficient force to urge a liquid droplet 24 above the threshold size to move along the surface 26a, 26b having the degraded hydrophobic coating.

A threshold size may be based on a focal length of the optical sensor 28, as the detected size of the liquid droplet 24 may vary depending on the focal length. For example, a group of pixels identified as a liquid droplet 24 will be smaller when the focal length of the optical sensor 28 is set such that the surface 26a, 26b is in focus, and a group of pixels identified as such liquid droplet 24 will be larger when the focal length of the optical sensor 28 is set such that objects beyond the surface 26a, 26b, i.e., farther from the optical sensor 28 than the surface 26a, 26b, are in focus. The computer 34 may store multiple threshold sizes for comparison with the liquid droplet 24, e.g., with different threshold sizes respectively associated with different focal lengths. The computer 34 may perform a computation to compute the inverse point spread function such that the original in focus droplet image can be calculated and the actual drop size estimated.

The computer 34 may also determine that the hydrophobic coating is undegraded when the computer 34 identifies that a distribution, e.g. normal distribution, Weibull distribution, of sizes of multiple liquid droplets 24 is different than a threshold distribution of sizes. For example, a confidence window of a statistical test may be used to determine if the two distributions are significantly different, such as a student's t-test or another statistical test. The threshold distribution of sizes may be determined based on real world testing and/or computer modeling. For example, the threshold distribution may be a normal distribution curve for sizes of liquid droplets 24 on surface 26a, 26b having an undegraded hydrophobic coating.

The computer 34 may be programmed to compare a shape of the liquid droplet 24 with a threshold shape, e.g., within a roundness tolerance of 0.5 millimeter. The roundness tolerance indicates a maximum permissible variation of radii of the contact area of the liquid droplet 24 along the surface 26a, 26b. The computer 34 may identify a shape of the liquid droplet 24 based on an outer perimeter of the pixels identified as the liquid droplet 24. For example, the computer 34 may use image recognition techniques to identify an outer edge of the liquid droplet 24 in the image data, and such edge may be compared to the threshold shape. The threshold may be a maximum tolerance, e.g., a roundness tolerance (such as 0.5 millimeters), of the liquid droplet 24 at which the hydrophobic coating is considered undegraded. In other words, the computer 34 may determine that the hydrophobic coating is undegraded when the computer 34 identifies the roundness of the liquid droplet 24 is at or below the threshold shape, and the computer 34 may determine that the hydrophobic coating is degraded when the computer 34 identifies the roundness of the liquid droplet 24 is above the threshold shape. The computer 34 may take into account other forces, e.g. wind speed and direction, that would alter the shape and appearance of the droplet at a fixed surface energy.

The threshold shape may be selected based on real world testing and/or computer modeling. For example, a range of variations of radii of the of contact area of the liquid droplet 24 along the surface 26a, 26b may be determined for liquid droplets 24 on an undegraded hydrophobic coating and another range of variation of radii of the of contact area of the liquid droplet 24 along the surface 26a, 26b may be determined for liquid droplets 24 on a degraded hydrophobic coating. The roundness tolerance may be selected to bifurcate such groups, e.g., into a first sub-group including liquid droplets 24 on the undegraded hydrophobic coating having a variation of radii of the contact area of the liquid droplet 24 along the surface 26a, 26b below the threshold, and a second sub-group including liquid droplets 24 on the degraded hydrophobic coating having a variation of radii of the of contact area of the liquid droplet 24 along the surface 26a, 26b above the threshold.

The computer 34 may be programmed to compare a transparency of the liquid droplet 24 with a threshold transparency. The computer 34 may determine the transparency by comparing an average brightness (e.g., in lux) of the pixels identified as the liquid droplet 24 with an average brightness of a remainder of the pixel of the image data. The threshold transparency may be a maximum difference between such pixel brightness averages at which the hydrophobic coating is considered undegraded. In other words, the computer 34 may determine that the hydrophobic coating is undegraded when the computer 34 identifies that the difference between the average brightness of the pixels identified as the liquid droplet 24 and the average brightness of the remainder of the pixel of the image data is at or below the threshold transparency. The computer 34 may make such comparison when an average brightness of the pixels is above a specified threshold, e.g., indicating that is it day time.

The computer 34 may be programmed to compare a luminosity gradient of the liquid droplet 24 with a threshold luminosity gradient, e.g., within a threshold amount of brightness change over a specified distance. The computer 34 may identify a luminosity gradient of the liquid droplet 24 based on the pixels identified as the liquid droplet 24. For example, the computer 34 may use identify a brightest of pixels at an outer edge of the liquid droplet 24 in the image data, a brightness of pixels at a first specified distance (e.g. 0.5 millimeters) away from the outer edge toward a center of the liquid droplet 24 in the image data, a brightness of pixels at a second specified distance (e.g. 1.0 millimeters) away from the outer edge toward the center of the liquid droplet 24 in the image data, etc. The computer 34 may calculate the luminosity gradient using the brightnesses and distances, e.g., using conventional calculation methods to determine a slope of a best fit line. The slope indicates a rate at which brightness is changing. The computer 34 may calculate multiple luminosity gradients about a perimeter of the liquid droplet 24 and average the results to determine an overall luminosity gradient for the liquid droplet 24. An individual luminosity gradient and/or overall luminosity gradient of the liquid droplet 24 may be compared to the threshold luminosity gradient. The threshold may be a minimum threshold, e.g., a minimum slope of the luminosity gradient at which the hydrophobic coating is considered undegraded. In other words, the computer 34 may determine that the hydrophobic coating is undegraded when the computer 34 identifies the slope of the luminosity gradient of the liquid droplet 24 is at or above the threshold luminosity gradient, and the computer 34 may determine that the hydrophobic coating is degraded when the computer 34 identifies the slope of the luminosity gradient of the liquid droplet 24 is below the threshold luminosity gradient. The computer 34 may take into account other forces, e.g. wind speed and direction, that would alter the shape and appearance of the droplet at a fixed surface energy.

The threshold luminosity gradient may be selected based on real world testing and/or computer modeling. For example, a range of slopes of luminosity gradients of liquid droplets 24 may be determined for liquid droplets 24 on an undegraded hydrophobic coating and another range of slopes of luminosity gradients may be determined for liquid droplets 24 on a degraded hydrophobic coating. The threshold luminosity gradient may be selected to bifurcate such groups, e.g., into a first sub-group including liquid droplets 24 on the undegraded hydrophobic coating having slopes of luminosity gradients above the threshold, and a second sub-group including liquid droplets 24 on the degraded hydrophobic coating having slopes of luminosity gradients below the threshold.

The computer 34 may be programmed to compare a distribution of the liquid droplet 24 and one or more other liquid droplets 24 with a threshold distribution. The computer 34 may determine the distribution by determining a distance D2 in the image data between groups of pixels identified as liquid droplets 24 in the image data. The threshold distribution may be a minimum distance (such as 15 millimeters) between the liquid droplets 24 at which the hydrophobic coating is considered undegraded. In other words, the computer 34 may determine that the hydrophobic coating is undegraded when the computer 34 identifies that the distance between liquid droplets 24 is at or above the threshold distribution. Further, the computer 34 may determine that the hydrophobic coating is degraded when the computer 34 identifies that the distance between liquid droplets 24 is below the threshold distribution.

The threshold distribution, i.e., a specified distance between liquid droplets 24, may be selected based on real world testing and/or computer modeling. For example, a first range of distances between liquid droplets 24 may be determined for liquid droplets 24 on a surface 26a, 26b with an undegraded hydrophobic coating. Further, a second range of distances between liquid droplets 24 may be determined for liquid droplets 24 on a surface 26a, 26b with a degraded hydrophobic coating. The distances may be selected to bifurcate such groups, e.g., into a first group including liquid droplets 24 on the undegraded hydrophobic coating having a distance above the threshold distribution, and a second group including liquid droplets 24 on the degraded hydrophobic coating having a distance below the threshold distribution.

The computer 34 may be programmed to compare an amount of distortion of an image reflected by the liquid droplet 24 with a threshold distortion value. The computer 34 may determine the distortion based on analysis of the group of pixels identified as the liquid droplet 24, e.g., using known image recognition techniques. For example, the computer 34 may identify a horizon 46 in the group of pixels identified as the liquid droplet 24 by identifying a border between areas of different brightness, color, etc. The computer 34 may also identify a horizon 46 in image data outside the group of pixels identified as the liquid droplet 24. The computer 34 may determine the distortion as a difference in average radius of curvature between the horizon 46 reflected by the liquid droplet 24 and the horizon 46 not reflected by the liquid droplet 24. As another example, the computer 34 may determine the distortion by calculating a distortion coefficient, as discussed above, based on a comparison of the group of pixels identified as the liquid droplet 24 with image data outside the group of pixels. The computer 34 may computationally correct for an out of focus aberration or otherwise take into account the out of focus aberration, e.g. point spread function, to determine the amount of distortion of an image reflected by the liquid droplet 24.

The threshold distortion may be selected based on real world testing and/or computer modeling. For example, a range of distortions for liquid droplets 24 on a surface 26a, 26b having an undegraded hydrophobic coating and another range of distortions for liquid droplets 24 on a surface 26a, 26b having a degraded hydrophobic coating may be identified. The distortions may be selected to bifurcate such groups, e.g., into a first sub-group including liquid droplets 24 on the undegraded hydrophobic coating having a distortion above the threshold distortion, and a second sub-group including liquid droplets 24 on the degraded hydrophobic coating having a distortion below the threshold distortion.

Figure 4:
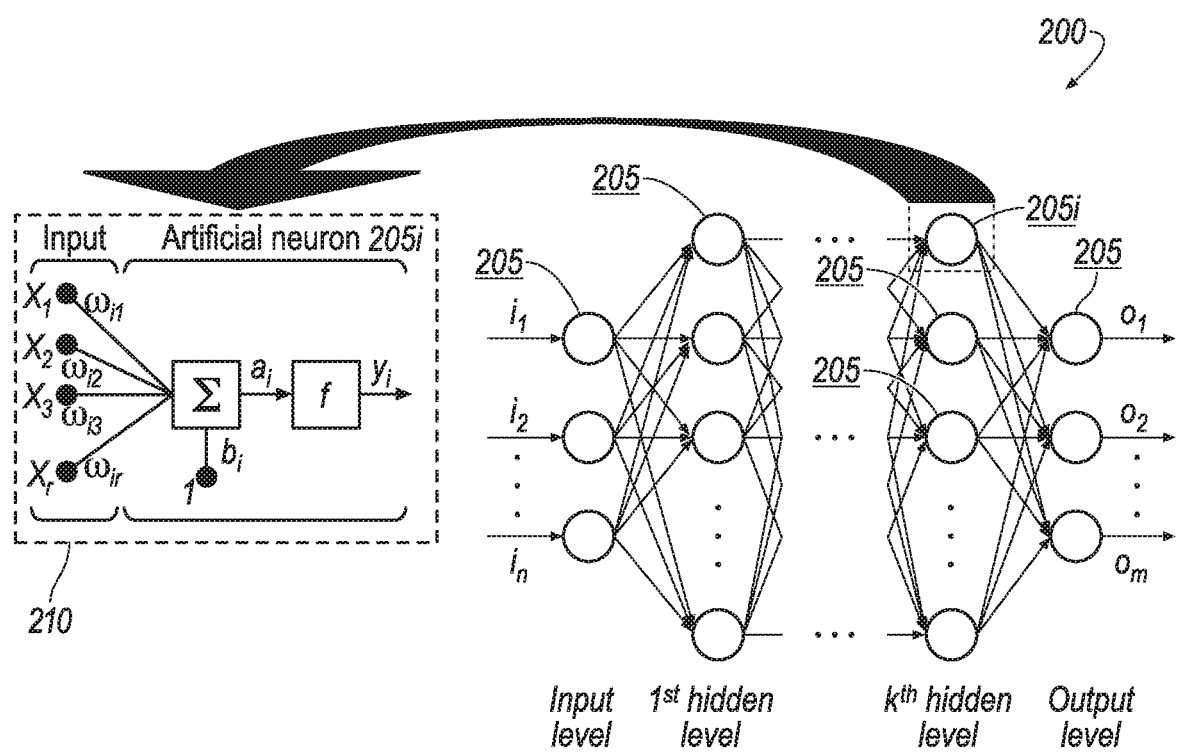
FIG. 4 illustrates an example Deep Neural Network (DNN).

The computer 34 may be programmed to compare a contact angle 44 of the liquid droplet 24 with a threshold contact angle. The computer 34 may calculate the contact angle 44 based on one or more of a detected size, shape, brightness, color, distribution, luminosity gradient, or other measurable characteristic of the liquid droplet 24. The computer 34 may calculate the contact angle 44 with machine learning programming, e.g., a neural network, such as a deep neural network 200 (shown in FIG. 4). The DNN 200 can be a software program that can be loaded in memory and executed by a processor included in the computer 34, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. Each layer may consist of a specific type such as fully connected, convolutional, dropout, pooling, softmax, etc. The nodes 205 are sometimes referred to as artificial neurons 205, because they are designed to emulate biological, e.g., human, neurons. A neuron block 210 illustrates inputs to and processing in an example artificial neuron 205i. A set of inputs $x_1 \ldots x_r$ to each neuron 205 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 205i output $y_i$. The activation function $f$ can be a variety of suitable functions, typically selected based on empirical analysis. The respective neurons 205 may be feed forward or recurrent, e.g., long short-term memory (LSTM) units.

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200. Training may be an iterative operation. In one example, the computer 34 may be programmed to perform an iterative training until an error, i.e., a difference between an expected output (based on training data obtained from simulation or experimentation) relative to an output from the trained DNN 200, is less than a specified threshold or loss, e.g., 10%.

The DNN 200 can be trained with inputs including an incline angle(s) 33 of the surface 26a, 26b, a size of the liquid droplet 24, a speed of the vehicle 22, ambient air movement, a shape of the liquid droplet 24, a brightness of the liquid droplet 24, a luminosity gradient of the liquid droplet 24, a color of the liquid droplet 24, a distribution of the liquid droplet 24 with more other liquid droplets 24, etc., and to output a contact angle 44 of the liquid droplet 24. The DNN 200 can be trained with ground truth data, i.e., data about a real-world or baseline condition or state, such as, surface 26a, 26b incline angles 33, liquid droplet 24 sizes, liquid droplet 24 shapes, liquid droplet 24 brightness, liquid droplet 24 colors, air temperature, humidity, etc. Weights w can be initialized by using a Gaussian distribution, for example, and a bias b for each node 205 can be set to zero. Training the DNN 200 can including updating weights and biases via conventional techniques such as back-propagation with optimizations. Data can be associated with contact angles 44 for training the DNN 200, i.e., known contact angles 44 of liquid droplets 24 may be associated with the input ground truth data. The liquid droplets 24 used for such ground truth data may be provided by the cleaning system 36, e.g., when actuated to provide the specified amount.

Once the DNN 200 is trained, the computer 34 can input the size of the liquid droplet 24, the shape of the liquid droplet 24, the distribution of the liquid droplet 24, the color of the liquid droplet 24, the brightness of the liquid droplet 24, etc., and can output a contact angle 44 of the liquid droplet 24.

The threshold contact angle may be selected based on real world testing and/or computer modeling. For example, a range of contact angles 44 for liquid droplets 24 on a surface 26a, 26b having an undegraded hydrophobic coating and another range of contact angles 44 for liquid droplets 24 on a surface 26a, 26b having a degraded hydrophobic coating may be identified. The contact angles 44 may be selected to bifurcate such groups, e.g., into a first sub-group including liquid droplets 24 on the undegraded hydrophobic coating having a contact angle 44 below the threshold contact angle, and a second sub-group including liquid droplets 24 on the degraded hydrophobic coating having a contact angle 44 above the threshold contact angle.

Multiple threshold contact angles (or other thresholds discussed above) may be used. For example, a first contact angle threshold and a second contact angle that is greater than the first contact angle. The first contact angle may be used by the computer 34 to determine that the cleaning system 36 should actuate at an increased interval. The second contact angle may be used by the computer 34 to determine that a fault code should be stored and/or transmitted, and/or that the vehicle should be navigated to a specified location suitable for servicing the vehicle 22 to repair or replace the hydrophobic coating.

Process

FIG. 5 is a process flow diagram illustrating an exemplary process 500 for operating the system 20. The computer 34 may execute the process 500 when the vehicle 22 is stopped, e.g., when data for the sensors 42 indicates that the vehicle 22 is not moving, when the vehicle 22 is initially powered on, when the vehicle 22 is in a "park" mode, etc. Although not necessary, Executing the process 500 when the vehicle 22 is stopped reduces variables that may affect the size, shape, etc., of a liquid droplet 24 on the surface 26a, 26b. For example, acceleration of the vehicle 22, air movement relative to the surface 26a, 26b (e.g., from the vehicle 22 traveling at a speed and/or ambient air movement), etc., may affect a size, shape, etc., of the liquid droplet 24 and reduce an accuracy in determining whether the hydrophobic coating of the surface 26a, 26b is degraded. Such variables may be taken into consideration to increase accuracy in determining whether the hydrophobic coating of the surface 26a, 26b is degraded while the vehicle is moving, is subject to ambient air movement etc. For example, the various tolerances discussed above may be determined and/or the DNN 200 may be programed to account for such variables.

The process 500 begins in a block 505, in which the computer 34 receives data from the optical sensor 28, the sensors 42, etc., e.g., via the communication network 38. The computer 34 may receive such data substantially continuously or at time intervals, e.g., every 50 milliseconds. The computer 34 may store the data, e.g., on the memory.

Next, at a block 510, the computer 34 actuates the cleaning system 36 to clean the surface 26a, 26b. For example, the computer 34 may transmit an instruction to the cleaning system 36 to actuate the pump of the cleaning system 36 to spray liquid on the surface 26a, 26b and/or actuate the motor of the cleaning system 36 to wipe the windshield 30. Cleaning the surface 26a, 26b before determining whether the hydrophobic coating of the surface 26a, 26b is degraded reduces contaminants on the surface 26a, 26b that may reduce an accuracy of such determination.

Next, at a block 515, the computer 34 actuates the cleaning system 36 to provide a specified amount of liquid to the surface 26a, 26b. For example, the computer 34 may transmit an instruction to the cleaning system 36 indicating the specified amount of liquid to provide, e.g., as described above.

Next, at a block 520, the computer 34 captures image data of the surface 26a, 26b, e.g., before actuating the cleaning system 36 to wipe the liquid provided to the surface 26a, 26b in the block 515. Based on the captured image data the computer 34 may identify one or more liquid droplets 24 on the surface 26a, 26b, e.g., as described above.

Next at a block 525 the computer 34 determines whether the hydrophobic coating of the surface 26a, 26b is degraded based on a comparison of a measurement of the liquid droplet 24 identified in the block 520 with a threshold value, e.g., as described above. For example, the computer 34 may compare a size of the liquid droplet 24 and with a threshold size, a shape of the liquid droplet 24 and with a threshold shape, a distribution of the liquid droplet 24 and one or more other liquid droplets 24 with a threshold distribution, a luminosity gradient of the liquid droplet 24 with a threshold luminosity gradient, a contact angle 44 of the liquid droplet 24 with a threshold contact angle, an amount of distortion of an image reflected by the liquid droplet 24 with a threshold distortion, etc., e.g., as described above. Upon determining the hydrophobic coating is not degraded the process 500 moves to a block 530. Upon determining that the hydrophobic coating is degraded the process 500 moves to a block 535. If the computer 34 is unable to make the determination in the block 525 the process 500 returns to the block 510.

At the block 530 the computer 34 actuates the cleaning system 36 to remove the liquid provided to the surface 26a, 26b at the block 515. For example, the computer 34 may transmit an instruction to the cleaning system 36 to actuate the wipers or the blower of the cleaning system 36. After the block 530 the process 500 may end. Alternately, the process may return to the block 505.

At the block 535 the computer 34 actuates a component of the vehicle 22. For example, the computer 34 may actuate the memory to store a fault code indicating the hydrophobic coating is degraded. As another example, the computer 34 may transmit a fault code indicating the hydrophobic coating is degraded, e.g., to the remote computer 48. As yet another example, the computer 34 may actuate the vehicle 22 to navigate to a specified location suitable for servicing the vehicle 22 to repair or replace the hydrophobic coating. As a final example, the computer 34 may increase an interval of actuation for the cleaning system 36, e.g., as described herein. After the block 530 the process 500 may move to the block 535. After the block 535 the process 500 may end. Alternately, the process may return to the block 505.

CONCLUSION

With regard to the process 500 described herein, it should be understood that, although the steps of such process 500 have been described as occurring according to a certain ordered sequence, such process 500 could be practiced with the described steps performed in an order other than the order described herein. It further should be understood that certain steps could be performed simultaneously, that other steps could be added, or that certain steps described herein could be omitted. In other words, the description of the process 500 herein is provided for the purpose of illustrating certain embodiments and should in no way be construed so as to limit the disclosed subject matter.

Computing devices, such as the computer 34, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a processor and a memory storing instructions executable by the processor to actuate a component upon determining that a hydrophobic coating of a surface is degraded based on a comparison of a characteristic of a liquid droplet with a threshold value,
wherein the instructions further include instructions to actuate a cleaning system to provide a specified amount of liquid to the surface before the comparison of the characteristic of the liquid droplet with the threshold value.

2. The system of claim 1, the instructions further including instructions to compare an amount of distortion of an image reflected by the liquid droplet with a threshold distortion value.

3. The system of claim 1, the instructions further including instructions to determine an object on the surface is the liquid droplet before the comparison of the characteristic of the liquid droplet with the threshold value.

4. The system of claim 1, wherein the instructions to actuate the cleaning system further include instructions to clean the surface before the comparison of the characteristic of the liquid droplet with the threshold value.

5. The system of claim 1, the instructions further including instructions to at least one of transmit a fault code and store the fault code upon determining that the hydrophobic coating of the surface is degraded.

6. The system of claim 1, the instructions further including instructions to increase an interval of actuation for a cleaning system upon determining that the hydrophobic coating of the surface is degraded.

7. The system of claim 1, the instructions further including instructions to compare a contact angle of the liquid droplet with a threshold contact angle.

8. The system of claim 1, the instructions further including instructions to compare a distribution of the liquid droplet and one or more other liquid droplets with a threshold distribution.

9. The system of claim 1, the instructions further including instructions to compare a size of the liquid droplet with a threshold size.

10. The system of claim 9, the instructions further including instructions to identify the threshold size based on a focal length of an optical sensor.

11. The system of claim 1, further comprising an optical sensor defining a field of view and in communication with the processor, wherein the surface is in the field of view.

12. The system of claim 1, further comprising a lens, the surface on the lens.

13. The system of claim 1, further comprising a windshield, the surface on the windshield.

14. A method, comprising:
actuating a cleaning system to provide a specified amount of liquid to a surface;
determining that a hydrophobic coating of the surface is degraded based on a comparison of a measurement a liquid droplet with a threshold value; and
then, actuating a component.

15. The method of claim 14, wherein the comparison of the measurement of the liquid droplet with the threshold value includes comparing a contact angle of the liquid droplet with a threshold contact angle.

16. The method of claim 14, wherein the comparison of the measurement of the liquid droplet with the threshold value includes comparing an amount of distortion of an image reflected by the liquid droplet with a threshold distortion.

17. The method of claim 14, further comprising determining an object on the surface is the liquid droplet before determining that the hydrophobic coating of the surface is degraded.

18. A system, comprising:
means for providing a specified amount of liquid to a surface by actuation of a cleaning system;
means for detecting a liquid droplet on the surface; and
means for actuating a component upon determining that a hydrophobic coating of the surface is degraded based on a comparison of a measurement of the liquid droplet with a threshold value.

19. The system of claim 18, further comprising means for comparing a contact angle of the liquid droplet with a threshold contact angle.

* * * * *